United States Patent
Kim et al.

(10) Patent No.: US 10,126,777 B2
(45) Date of Patent: Nov. 13, 2018

(54) PORTABLE DISPLAY DEVICE

(71) Applicant: LG ELECTRONICS INC., Seoul (KR)

(72) Inventors: Junhong Kim, Seoul (KR); Dongkyun Kang, Seoul (KR); Youngmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/529,286

(22) PCT Filed: Dec. 4, 2014

(86) PCT No.: PCT/KR2014/011810
§ 371 (c)(1),
(2) Date: May 24, 2017

(87) PCT Pub. No.: WO2016/085020
PCT Pub. Date: Jun. 2, 2016

(65) Prior Publication Data
US 2017/0262018 A1    Sep. 14, 2017

(30) Foreign Application Priority Data

Nov. 25, 2014 (KR) .................. 10-2014-0165205
Nov. 25, 2014 (KR) .................. 10-2014-0165206
(Continued)

(51) Int. Cl.
*H05K 7/00*    (2006.01)
*H05K 5/00*    (2006.01)
(Continued)

(52) U.S. Cl.
CPC ......... *G06F 1/1616* (2013.01); *G06F 1/1635* (2013.01); *G06F 1/1637* (2013.01);
(Continued)

(58) Field of Classification Search
CPC .................................................. G06F 2200/022
(Continued)

(56) References Cited

U.S. PATENT DOCUMENTS

2011/0074257 A1* 3/2011 Li .................. F16M 11/10
312/223.1
2013/0107449 A1  5/2013 Su et al.
2013/0265504 A1* 10/2013 Sato ................ H04N 5/645
348/836

FOREIGN PATENT DOCUMENTS

KR    10-2012-0037905 A    4/2012
KR    10-2013-0079978 A    7/2013
(Continued)

*Primary Examiner* — Jerry Wu
(74) *Attorney, Agent, or Firm* — Birch, Stewart, Kolasch & Birch, LLP

(57) ABSTRACT

According to one aspect of the present invention, a portable display device comprises: a front case having a display unit located on the front surface thereof; a rear case coupled to the rear side of the front case so as to form an electric field part; a middle frame arranged in the electric field art, and including a metal material; a stand having one end, which is hinge-coupled to the lower end of the middle frame, and rotatably moving around the hinge so as to come into contact with the rear side of the middle frame or to be spaced apart from the rear side of the middle frame; and an opening formed on the rear case at a location corresponding to the stand. Therefore, the portable display device can be easily held and used at any place without additionally carrying a separate holding device.

4 Claims, 14 Drawing Sheets

(30) Foreign Application Priority Data

Nov. 25, 2014 (KR) .......................... 10-2014-0165207
Nov. 25, 2014 (KR) .......................... 10-2014-0165208

(51) Int. Cl.
  *G06F 1/16* (2006.01)
  *G06F 1/20* (2006.01)
  *G06F 1/32* (2006.01)
  *G06F 1/26* (2006.01)

(52) U.S. Cl.
  CPC ............ *G06F 1/1656* (2013.01); *G06F 1/203* (2013.01); *G06F 1/263* (2013.01); *G06F 1/3212* (2013.01)

(58) Field of Classification Search
  USPC ................................................... 361/679.01
  See application file for complete search history.

(56) References Cited

FOREIGN PATENT DOCUMENTS

| | | | |
|---|---|---|---|
| KR | 10-2013-0124622 A | 11/2013 | |
| KR | 10-1397859 B1 | 5/2014 | |
| KR | 10-2014-0101654 A | 8/2014 | |
| KR | 10-2014-0112166 A | 9/2014 | |

* cited by examiner

FIG. 11
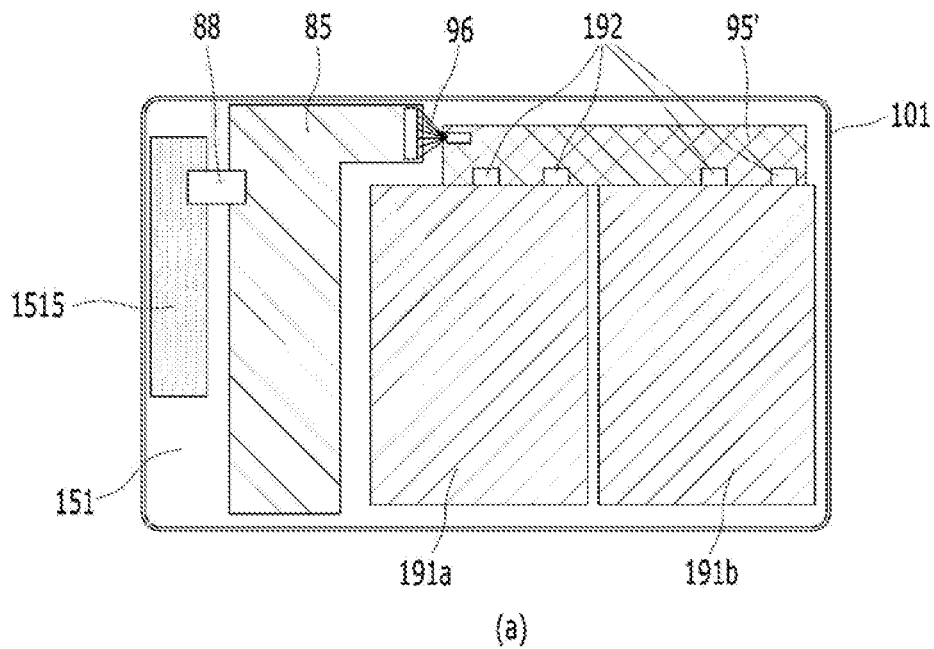
(a)
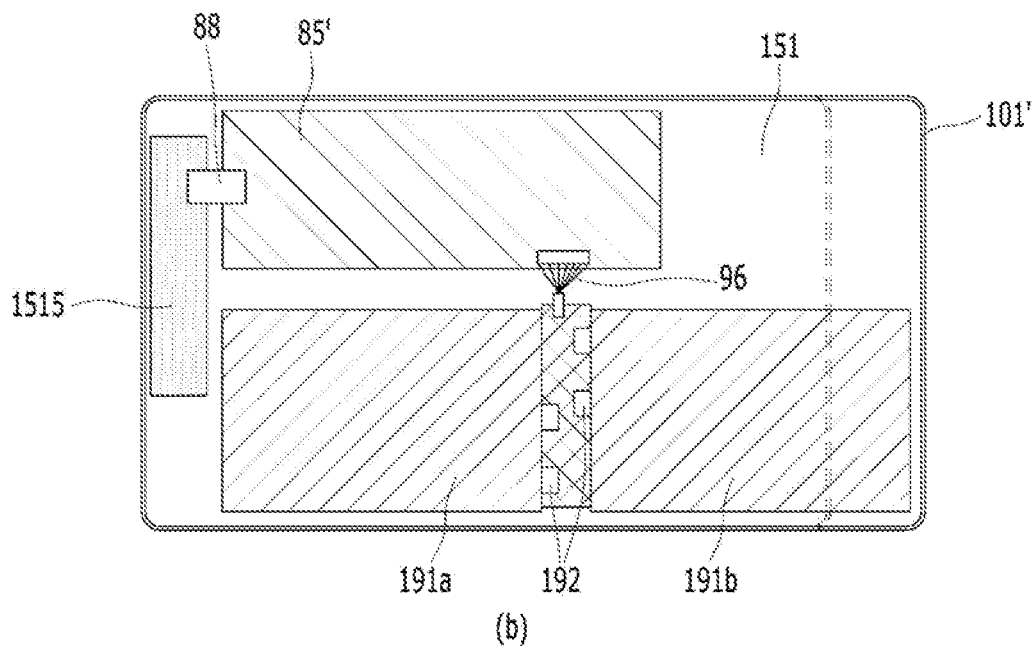
(b)

PORTABLE DISPLAY DEVICE

CROSS REFERENCE TO RELATED APPLICATIONS

This application is the National Phase of PCT International Application No. PCT/KR2014/011810, filed on Dec. 4, 2014, which claims priority under 35 U.S.C. 119(a) to Patent Application No. 10-2014-0165205, filed in Republic of Korea on Nov. 25, 2014, No. 10-2014-0165206, filed in Republic of Korea on Nov. 25, 2014, No. 10-2014-0165207, filed in Republic of Korea on Nov. 25, 2014, and No. 10-2014-0165208, filed in Republic of Korea on Nov. 25, 2014, all of which are hereby expressly incorporated by reference into the present application.

TECHNICAL FIELD

The present invention relates to a portable display device, which improves the convenience of carrying and the convenience of use.

BACKGROUND ART

A display device may receive information from the outside and output an image via a display unit. Although such a display device may use a wired cable for connection with an external device, it may receive external data through data communication such as, for example, Bluetooth or WiFi.

The display device includes the display unit on the front surface thereof. Since portions other than the display unit have recently been configured to be minimized in size, the size of the display device does not differ significantly from a display size.

Examples of the display device may include a cellular phone, a smart phone, a tablet PC, a laptop computer, and a netbook. The aforementioned display devices are mainly portable rather than stationary, and are considered with an eye to, for example, the convenience of carrying, the convenience of use regardless of location, and the possibility of continuous use of a battery.

In order to minimize the size for the convenience of carrying, unlike general stationary display devices, no cooling fan is mounted, and a touch input method is often adopted by adding a touch sensor to the display unit, instead of omitting a keyboard.

In addition, a support structure that may be held and used everywhere is needed for the convenience of use, and a large-capacity battery is being studied in order to realize extended use thereof.

Technical Object

The present invention provides a portable display device, which may maximize the capacity of a battery without increasing the size of the battery by improving the arrangement of the battery therein so as to increase space utilization, in order to improve the convenience of carrying and the convenience of use.

Technical Solution

According to one aspect of the present invention, there is provided a portable display device including a front case having a front surface on which a display unit is located, a rear case coupled to a rear surface of the front case so as to form an electric unit, a middle frame disposed on the electric unit and including a metal material, a stand having one end coupled to a lower end of the middle frame via a hinge and configured to rotate about the hinge so as to be brought into contact with a rear surface of the middle frame or to be spaced apart from the rear surface of the middle frame, and an opening formed in the rear case at a position corresponding to the stand.

The stand may have a remaining end configured to be located above a center of gravity of the portable display device when the stand is folded so as to come into contact with the middle frame.

The opening may include a first opening corresponding to a shape of the stand, and a second opening extending from one side of the first opening, at which a remaining end of the stand is located, so as to expose the middle frame.

The rear surface of the middle frame exposed by the second opening may include an inclined surface, which is lowered with decreasing distance to the remaining end of the stand.

The hinge may be limited in rotation when it reaches a rotation limitation angle or more, and the hinge may display a mark when reaching the rotation limitation angle.

According to another aspect, there is provided a portable display device including a front case having a front surface on which a display unit is located, a rear case coupled to a rear surface of the front case so as to form an electric unit, a middle frame disposed on the electric unit, a front magnet disposed on a front surface of the middle frame so that a first pole thereof faces the front surface of the middle frame, and a rear magnet disposed on a rear surface of the middle frame so that a first pole thereof faces the rear surface of the middle frame, wherein the front magnet has the same position when viewed from the front surface of the middle frame as a position of the rear magnet when viewed from the rear surface of the middle frame.

The portable display device may further include a keyboard case corresponding to a size of the front case or the rear case, a plurality of keys located on a front surface of the keyboard case, and a keyboard magnet disposed such that a second pole thereof, opposite the first pole, faces the front surface of the keyboard case, the front magnet and the keyboard magnet may be magnetically coupled to each other when the front surface of the keyboard case is disposed so as to face the front case, and the rear magnet and the keyboard magnet may be magnetically coupled to each other when the front surface of the keyboard case is disposed so as to face the rear case.

The front magnet may include a plurality of front magnets located on a periphery of the display unit, the front magnets may be point-symmetrically arranged about a center of the portable display device, and the rear magnet may include a plurality of rear magnets disposed at positions corresponding to positions of the front magnets.

The front magnet may include a first front magnet disposed on an upper intermediate position of a front surface of the portable display device, and a second front magnet disposed on a lower intermediate position of the front surface.

The front magnet may be located on each of four corners of the portable display device.

The front magnet and the rear magnet may be neodymium magnets.

According to still another aspect, there is provided a portable display device including a rectangular case including an electric unit therein, a battery disposed on a first area of the electric unit, and a main board disposed on a second area so as not to overlap the battery, wherein the first area has an L-shaped form, and wherein the battery includes a rectangular first battery having a longer side disposed parallel to a shorter side of the case, and a rectangular second battery having a longer side disposed parallel to a longer side of the case.

The portable display device may further include connectors located respectively at the shorter sides of the first battery and the second battery, a power board located between the first battery and the second battery, and an auxiliary board located close to the connector of the first battery and connected to the power board, the connector of the second battery may be directly connected to the power board, and the connector of the first battery may be connected to the power board via the auxiliary board.

The portable display device may further include a middle frame disposed on the electric unit, the battery may be disposed on a front surface of the middle frame, and the main board may be located on a rear surface of the middle frame.

The portable display device may further include a flexible board configured to connect the main board and the display unit to each other.

The flexible board may be disposed across a rear surface of the first battery.

According to a further aspect, there is provided a display device including a front case having a front surface on which a display unit is located, a rear case coupled to a rear surface of the front case so as to form an electric unit, a middle frame disposed on the electric unit and including a metal material, a main board disposed on a rear surface of the middle frame so as to come into contact with the middle frame, a drive chip mounted toward a rear surface of the main board, and a heat transfer sheet interposed between the middle frame and the main board.

The display device may further include a shield can coupled to the main board so as to cover the drive chip, and a radiation sheet coupled to an inner surface of the rear case so as to come into contact with the shield can.

The heat transfer sheet may be disposed at a position corresponding to a position of the drive chip.

The middle frame may include magnesium.

The display device may further include a battery disposed in a first area of the electric unit, the main board may be disposed in a second area so as not to overlap the battery, and the middle frame may have no opening in the first area, and has an opening in the second area.

Advantageous Effects

According to at least one embodiment of the present invention, a portable display device may be easily held and used anywhere without the need to additionally carry a separate holding device.

In addition, a keyboard unit may be selectively carried and may be coupled to a main body to increase the convenience of carrying, and a display unit may be protected using the keyboard unit. When the portable display device is used without using the keyboard unit, the keyboard unit may be coupled to the rear surface of the main body so as to improve the convenience of use.

In addition, the display device may use a common battery, which may reduce manufacturing costs, and the capacity of the battery may be increased without increasing the size of the display device.

In addition, heat generated in a drive chip of a main board may be easily dissipated, which may prevent damage due to heat and may improve usability.

The additional range of the possibility of application of the present invention will be apparent from the following detailed description. However, various changes and modifications within the scope and the spirit of the present invention will be clearly understood by those skilled in the art, and therefore, it should be understood that the detailed description and particular embodiments such as exemplary embodiments of the present invention are merely given by way of example.

DESCRIPTION OF DRAWINGS

FIG. 11 is a view for explaining a comparison with FIG. 10.

BEST MODE

Figure 1:
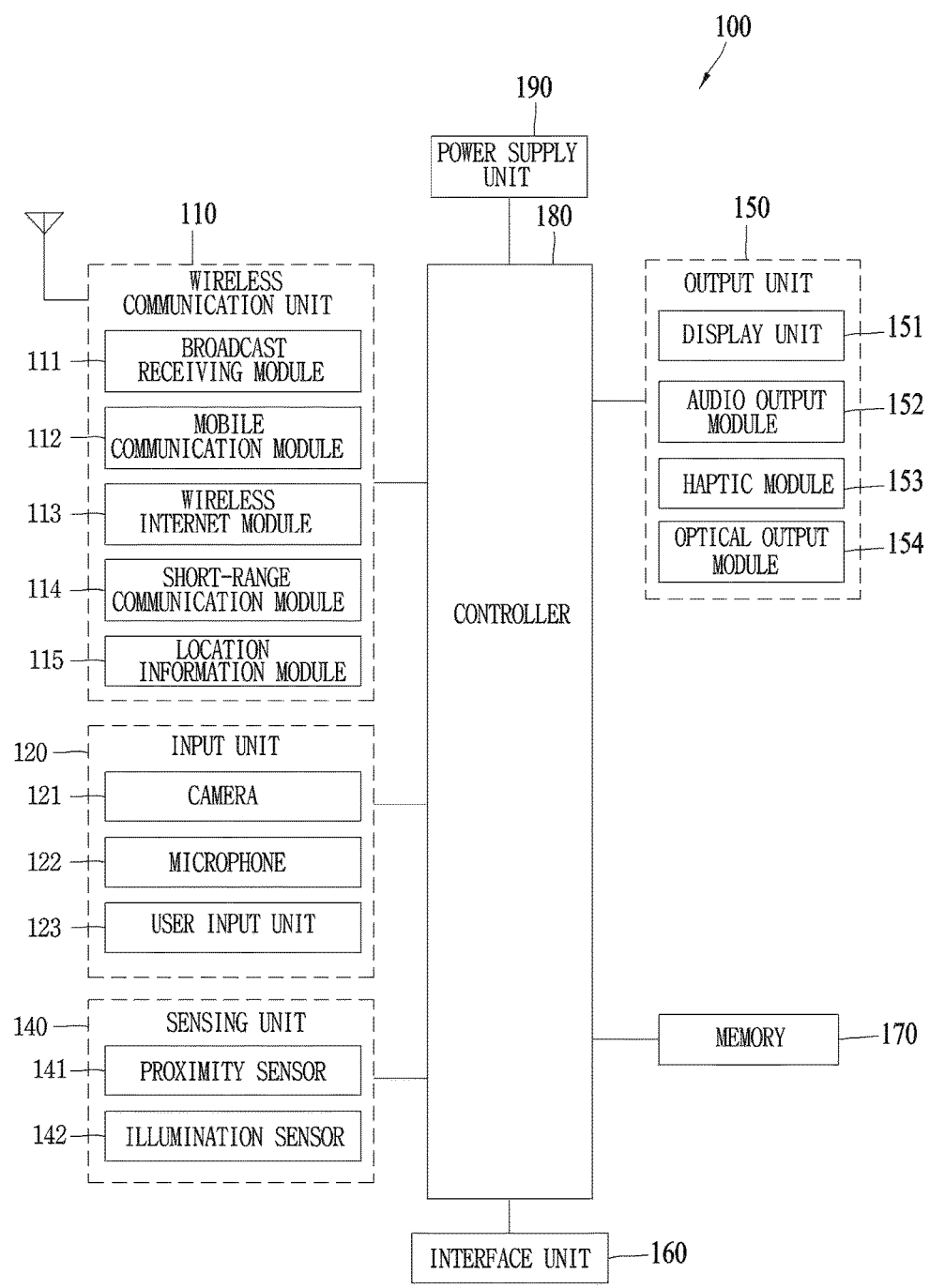
FIG. 1 is a block diagram for explaining a portable display device according to the present invention.

Hereinafter, embodiments disclosed in this specification will be described in detail with reference to the accompanying drawings, and the same or similar elements are denoted by the same reference numerals even though they are depicted in different drawings, and a repeated description thereof will be omitted. With respect to constituent elements used in the following description, suffixes "module" and "unit" are given or mingled with each other only in consideration of ease in the preparation of the specification, and do not have or serve as different meanings. In addition, in the following description of the embodiments, a detailed description of known functions and configurations incorporated herein will be omitted when it may impede the understanding of the embodiments. In addition, the accompanying drawings are intended to assist in the easy understanding of the embodiments disclosed in this specification, do not limit the technical spirit disclosed in this specification, and include all changes, equivalents, and substitutions included in the scope and spirit of the present invention.

Although terms such as, for example, "first" and "second" may be used to describe various elements, the elements are not limited by these terms. These terms are merely used to distinguish the same or similar elements from each other.

It will be understood that when any one element is referred to as being "connected to" or "coupled to" another element, it may be directly connected to or coupled to the other element or intervening elements may be present. In contrast, when any one element is referred to as being "directly connected to" or "directly coupled to" another element, there are no intervening components present.

The singular forms are intended to include the plural forms as well, unless the context clearly indicates otherwise.

It will be further understood that the terms "comprises" or "includes" when used in this application specify the presence of stated features, integers, steps, operations, elements, components, or combinations, but do not preclude the possibility of presence or addition of one or more other features, integers, steps, operations, elements, components, or combinations.

FIG. 1 is a block diagram for explaining a portable display device according to the present invention.

The portable display device 100 may include, for example, a wireless communication unit 110, an input unit 120, a sensing unit 140, an output unit 150, an interface unit 160, a memory 170, a controller 180, and a power supply unit 190. The elements illustrated in FIG. 1 may not be necessary to realize the portable display device, and thus the portable display device described in this specification may include a greater or smaller number of elements than the aforementioned elements.

More specifically, among the above elements, the wireless communication unit 110 may include one or more modules, which enable wireless communication between the portable display device 100 and a wireless communication system, between the portable display device 100 and another portable display device 100, or between the portable display device 100 and an external server. In addition, the wireless communication unit 110 may include one or more modules that connect the portable display device 100 to one or more networks.

The wireless communication unit 110 may include at least one of a broadcast receiving module 111, a mobile communication module 112, a wireless internet module 113, a local communication module 114, and a location information module 115.

The input unit 120 may include a camera 121 or a video input unit for the input of video signals and a microphone 122 or an audio input unit for the input of audio signals, and may further include, for example, a touch-key or a push key (e.g. a mechanical key). Voice data or image data collected by the input unit 120 may be analyzed and processed as a user control command.

The sensing unit 140 may include one or more sensors used to sense at least one of information regarding the portable display device, information regarding the environment surrounding the portable display device, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g. the camera 121), the microphone 122, a battery gauge, environmental sensors (e.g. a barometer, a hygrometer, a thermometer, a radioactivity sensor, a heat sensor, and a gas sensor), and chemical sensors (e.g. an electric nose, a healthcare sensor, and a biometric sensor). Meanwhile, the portable display device disclosed in this specification may combine and use pieces of information sensed by at least two sensors among the aforementioned sensors.

The output unit 150 serves to generate, for example, visual output, aural output, or tactile output. The output unit 150 may include at least one of the display unit 151, a sound output unit 152, a haptic module, and a light output unit 154. The display unit 151 may be layered or integrated with a touch sensor, thereby realizing a touchscreen. Such a touchscreen may function as a user input unit 123, which provides an input interface between the portable display device 100 and a user, and may also provide an output interface between the portable display device 100 and the user.

The interface unit 160 serves as a passageway between the portable display device 100 and any of various types of external appliances connected thereto. The interface unit 160 may include at least one of a wired/wireless headset port, an outer charger port, a wired/wireless data port, a memory card port, a port for the connection of a device having an identification module, an audio input/output (I/O) port, a video input/output (I/O) port, and an earphone port. The portable display device 100 may perform appropriate control related to an external appliance when the external appliance is connected thereto.

The memory 170 stores data that supports various functions of the portable display device 100. The memory 170 may store multiple applications or apps, which are executed in the portable display device 100, as well as data and commands for the operation of the portable display device 100. At least some of these applications may be downloaded from an external server via wireless communication. In addition, at least some of the applications may be present in the portable display device 100 at the release time thereof for the basic functions (e.g. call reception and transmission functions and message reception and transmission functions) of the portable display device 100. Meanwhile, the applications may be stored in the memory 170 and mounted in the portable display device 100 and may be executed so as to perform the operations (or the functions) of the portable display device.

The controller 180 usually controls the general operations of the portable display device 100, in addition to operation related to the applications. The controller 180 may provide information or functions suitable for the user by processing, for example, signals, data and information input or output through the above-described elements, or by executing the applications stored in the memory 170.

In addition, in order to execute the applications stored in the memory 170, the controller 180 may control at least some of the elements described in FIG. 1. In addition, the controller 180 may combine and operate at least two of the elements included in the portable display device 100 for execution of the applications.

The power supply unit 190 receives an external voltage or an internal voltage and supplies the voltage to the respective elements included in the portable display device 100 under the control of the controller 180. The power supply unit 190 may include a battery, and the battery may be a built-in battery or a replaceable battery.

At least some of the above-described elements may be operated in cooperation with one another in order to realize the operation or control of the portable display device or a control method thereof according to various embodiments, which will be described below. In addition, the operation or control of the portable display device or a control method thereof may be realized by the portable display device via the execution of at least one application stored in the memory 170.

Figure 2:
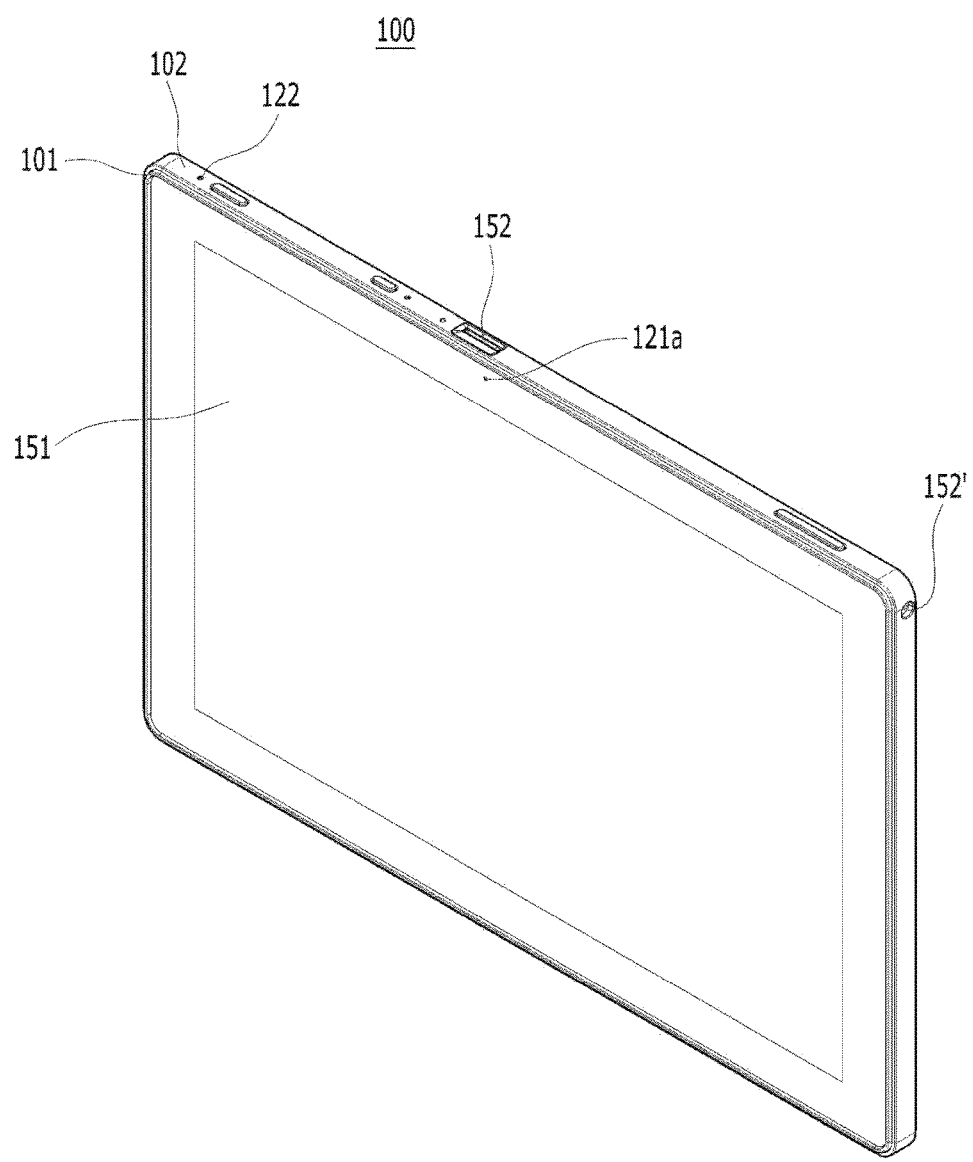
FIG. 2 is a front perspective view of the portable display device according to the present invention.
Figure 3:
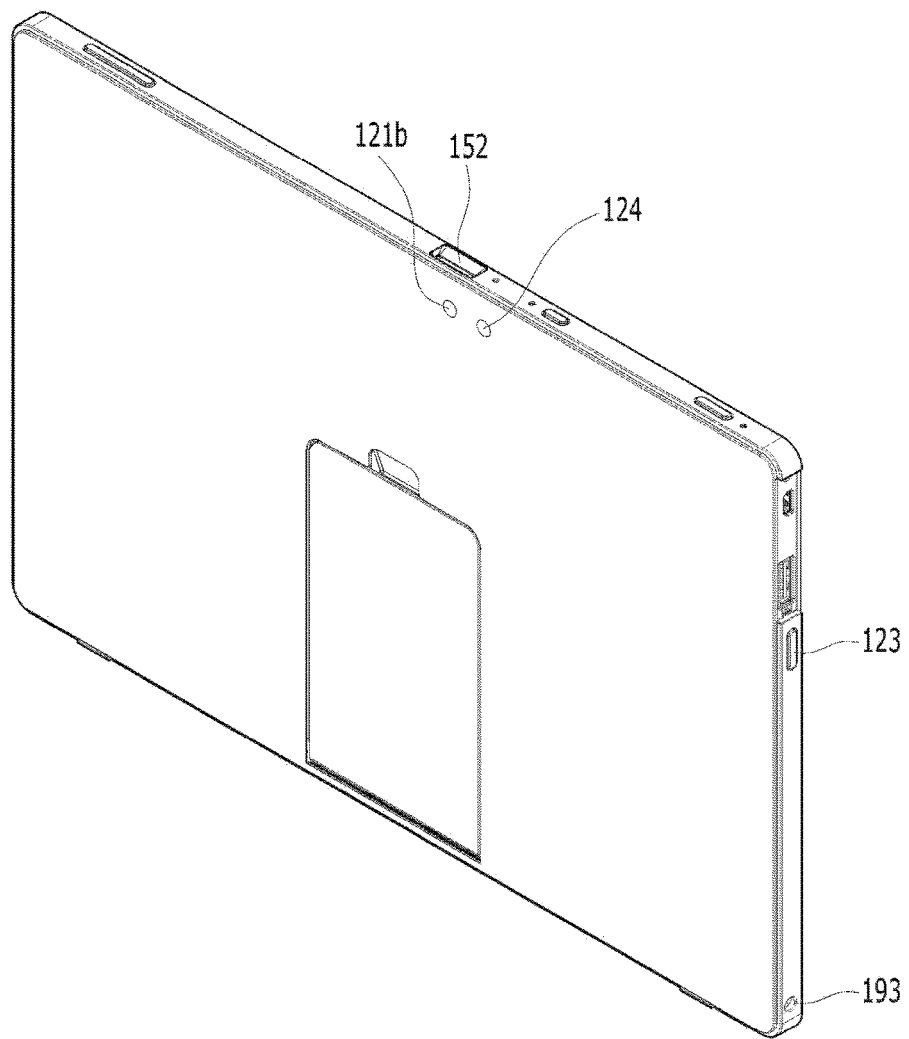
FIG. 3 is a rear perspective view of the portable display device according to the present invention.

FIG. 2 is a front perspective view of the portable display device 100 according to the present invention, and FIG. 3 is a rear perspective view of the portable display device 100 according to the present invention. Since an image is generally provided inside a rectangular frame, the display device 100 may include a rectangular display unit 151 and may have a rectangular shape corresponding to the rectangular display unit 151.

Herein, the term "main body" may be understood as indicating a single entity of the portable display device 100. The display device 100 includes a case (e.g. a frame, a housing, or a cover) forming the external appearance of the device.

Although the case may take the form of a unit body that is an integrated body, generally, the case may include a front case 101 forming the front-side appearance thereof and a rear case 102 forming the rear-side appearance thereof. Various electric parts are disposed in the inner space defined by the coupling of the front case 101 and the rear case 102. At least one middle case 104 may be additionally disposed between the front case 101 and the rear case 102.

The display unit 151 may be disposed on the front surface of the main body that is the display device 100 and may output information. As illustrated, the window of the display unit 151 may be mounted to the front case 101 so as to form the front surface of the terminal main body in conjunction with the front case 101.

These cases 101 and 102 may be formed by injection molding a synthetic resin, or may be formed of a metal such as, for example, stainless steel (STS), aluminum (Al), or titanium (Ti).

The portable display device 100 may be configured such that one case provides the inner space, unlike the above example in which the multiple cases 101 and 102 provide the inner space in which various electric parts are accommodated. In this case, the portable display device 100 may be realized as a unit body formed of a synthetic resin or a metal, which has no seam between the side surface and the rear surface thereof.

Meanwhile, the portable display device 100 may include a waterproofer (not illustrated) to prevent water from permeating into the terminal main body. For example, the waterproofer may include a waterproof member provided between a window 151a and the front case 101, between the front case 101 and the rear case 102, or between the rear case 102 and a rear cover, to hermetically seal the inner space when these elements are coupled to each other.

The portable display device 100 may include, for example, the display unit 151, first and second sound output units 152, the proximity sensor 141, the illumination sensor 142, the light output unit 154, first and second cameras 121a and 121b, the microphone 122, and the interface unit 160.

The display unit 151 displays (outputs) information processed in the portable display device 100. For example, the display unit 151 may display execution screen information of the application executed in the portable display device 100, or information regarding a user interface (UI) or a graphic user interface (GUI) depending on the execution screen information.

The display unit 151 may include at least one of a liquid crystal display (LCD), a thin-film transistor liquid crystal display (TFT LCD), an organic light-emitting diode (OLED) display, a flexible display, a 3-dimensional (3D) display, and an electronic ink (e-ink) display.

The display unit 151 may include a touch sensor, which senses a touch on the display unit 151, in order to receive a control command by a touch method. With the use of the touch sensor, when the display unit 151 is touched, the touch sensor may sense a touch, and the controller 180 may generate a control command corresponding to the touch based on the sensed result. Content input via the touch method may be, for example, characters or numbers, or instructions or assignable menu items in various modes.

Meanwhile, the touch sensor may be configured as a film having a touch pattern and may be disposed between the window 151a and a display (not illustrated) on the rear surface of the window 151a, or may be a metal wire that is directly patterned on the rear surface of the window 151a. Alternatively, the touch sensor may be integrally formed with the display. For example, the touch sensor may be disposed on a substrate of the display, or may be provided inside the display.

As described above, the display unit 151 may form a touchscreen along with a touch sensor, and in this case, the touchscreen may function as a user input unit 123 (see FIG. 1).

The sound output unit 152 may be realized as a loud speaker, which outputs various alarm sounds or multimedia playback sounds. In order to use an external output device rather than using the sound output unit 152 of the portable display device 100, the portable display device may further include an ear jack plug 152' for connection between the portable display device 100 and such an external output device.

The light output unit 154 is configured to output light for indicating that an event occurs. Examples of the event may include message reception, call signal reception, missed call indication, alarm, schedule reminder, e-mail reception, and information reception through applications. The controller 180 may control the light output unit 154 so as to end the output of light when it is sensed that the user has checked the event.

The first camera 121a processes the image frame of a still image or a moving image acquired by an image sensor in a photographing mode or a video calling mode. The processed image frame may be displayed on the display unit 151, and may be stored in the memory 170.

The microphone 122 is configured to receive, for example, user voice and other sounds. The microphone 122 may be provided at multiple positions so as to receive stereo sound.

The interface unit 160 serves as a passageway for connection between the portable display device 100 and an external appliance. For example, the interface unit 160 may be at least one of a connection terminal for connection with another device (e.g. an earphone or an external speaker), a local communication port (e.g. an infrared port (IrDA port), a Bluetooth port, or a wireless LAN port), and a power supply terminal that supplies a voltage to the portable display device 100. The interface unit 160 may be realized as a socket, which accommodates an external card such as, for example, a subscriber identification module (SIM) or user identity module (UIM) card or a memory card for storing information.

The second camera 121b may be disposed on the rear surface of the portable display device 100. In this case, the second camera 121b has a photographing direction that is substantially opposite that of the first camera 121a.

The second camera 121b may include multiple lenses arranged along at least one line. The multiple lenses may be arranged in a matrix form. Such a camera may be called an array camera. When the second camera 121b is configured as an array camera, an image may be photographed using the multiple lenses in various ways, and a higher quality image may be acquired.

A flash 124 may be disposed close to the second camera 121b. The flash 124 shines a light toward a subject when the second camera 121b photographs the subject.

The portable display device 100 may include at least one antenna for wireless communication. The antenna may be mounted in the terminal main body, or may be formed on the case. For example, an antenna, which forms a portion of the broadcast receiving module 111 (see FIG. 1), may be configured so as to be drawn from the terminal main body. Alternatively, a film-type antenna may be attached to the inner surface of the rear case 102, or a case formed of a conductive material may function as an antenna.

The portable display device 100 includes the power supply unit 190 (see FIG. 1), which supplies a voltage to the portable display device 100. The power supply unit 190 may include a battery 191, which is mounted in the portable display device 100 or is detachable from the outside of the terminal main body.

The battery 191 may have a separate power connection port 193, and may be configured to receive a voltage through a power cable connected to the interface unit 160. In addition, the battery 191 may be configured to enable wireless charging via a wireless charger. The wireless charging may be realized in a magnetic induction manner or in a resonance (magnetic resonance) manner.

The portable display device 100 may further include a stand 105 provided on the rear surface thereof to hold the portable display device 100. The stand 105 may be coupled to the lower end of the portable display device 100 via a hinge so as to be rotated and unfolded about the hinge. Thereby, the stand 105 may support the portable display device 100 to allow the user to use the portable display device 100 held on, for example, a desk without gripping the portable display device 100 in the hand.

The portable display device 100 may further include an accessory, which protects the exterior of the device, or assists in or expands the function of the portable display device 100. One example of such an accessory may include a cover or a pouch, which covers or accommodates at least one surface of the portable display device 100. The cover or the pouch may be linked to the display unit 151 so as to expand the function of the portable display device 100. For example, the keyboard may be provided on the front surface of the portable display device 100, and a keyboard cover may be provided on the rear surface of the portable display device to protect the exterior of the portable display device.

Figure 4:
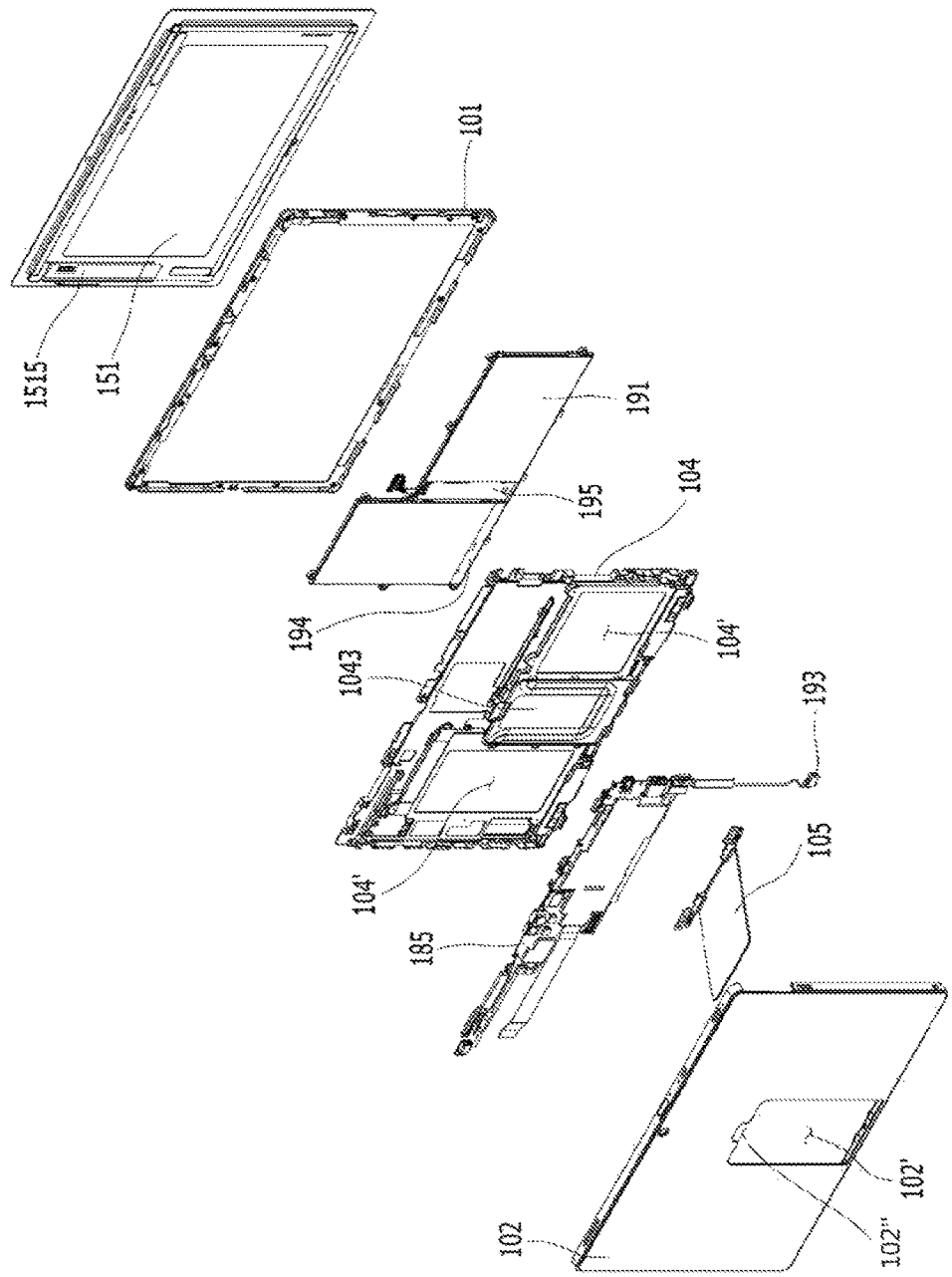
FIG. 4 is an exploded perspective view of the portable display device according to the present invention.

FIG. 4 is an exploded perspective view of the portable display device 100 according to the present invention. The portable display device 100 according to the present invention includes the front case 101 having the front surface coupled to the display unit 151, the battery 191 disposed on the rear surface of the display unit 151, the middle frame 104 disposed on the rear surface of the battery 191, a main board 185 coupled to the rear surface of the middle frame 104, and the rear case 102 configured to cover the rear surface of the portable display device.

The display unit 151 coupled to the front case 101 configures the front surface of the portable display device 100 in conjunction with the front case 101. A signal line is provided on the periphery of the display unit 151, and the display unit 151 includes a bezel configured to cover the periphery of the display unit so as to prevent the signal line from being exposed to the user. The bezel may be configured to allow the front case 101 to cover the periphery of the display unit 151, or may be printed on the periphery of the rear surface of the window coupled to the front surface of the display unit 151.

The display unit 151 is provided on the end thereof with a display board 1515 which drives each pixel according to information regarding an image to be displayed on the display unit 151. The display board 1515 may be provided on each of four sides or two sides, or may be provided alone and connected to only one side of the display unit 151, as illustrated in FIG. 4.

The display unit 151 and the display board 1515 may be connected to each other via a flexible board, and the display board 1515 and the main board 185 may also be connected to each other via the flexible board. The display board 1515 realizes an image by selective driving each pixel of the display unit 151 under the control of the main board 185.

Next, the battery 191 located on the rear surface of the display unit 151 occupies the largest area of any electric unit. In particular, the more multimedia device functions the portable display device 100 has, the greater the use time of the display unit 151 and the greater the amount of consumption of power of the battery 191, which causes a reduction in battery use time. In order to cope with the problem, a large-capacity battery 191 may be used, or two or more batteries 191 may be used, as illustrated in FIG. 4.

The middle frame 104 located on the rear surface of the battery 191 supports the rear surface of the display unit 151 and increases the rigidity of the portable display device 100 so as to prevent damage to the portable display device 100. For rigidity, the middle frame may be formed of a rigid metal material such as magnesium, and may be provided with an uneven portion to correspond to the shape of elements mounted thereto. Since a portion of the middle frame that requires a fine uneven portion, which is difficult to be realized using a metal, needs to be doubly injection-molded by putting a magnesium frame into a mold and introducing a molded article, an injection frame may be added to a portion thereof.

An opening 104' may be formed in a portion of the middle frame 104 in order to reduce the weight thereof, and a portion of the middle frame 104 may be removed in a region in which a thick element (e.g. the battery 191) is mounted in order to reduce the thickness of the portable display device 100. In addition, the middle frame 104 may be provided with an opening for connection between the display unit 151 and the battery 191, which are mounted on the front surface of the middle frame 104, and the main board 185, which is mounted on the rear surface of the middle frame 104.

The main board 185 is located on the rear surface of the middle frame 104 so as not to overlap the battery 191 in order to prevent an increase in thickness. A drive chip 186 is mounted on the main board 185 to drive the portable display device 100.

Figure 10:
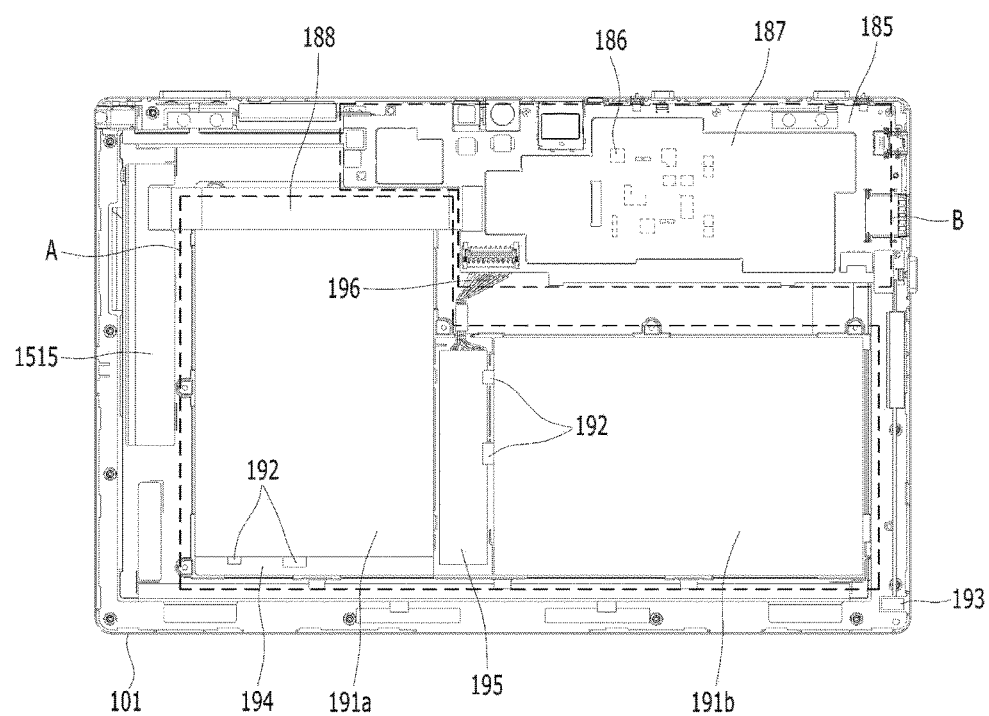
FIG. 10 is a view illustrating the arrangement of a battery and a main board in the portable display device according to the present invention.

The drive chip 186 is an application processor, which controls the respective elements of the portable display device 100 such as, for example, the display unit 151, the camera 121, and the sound output unit 152, and performs calculation in the portable display device 100, and includes any of various ICs such as, for example, a power distribution chip, which distributes supplied power to the respective elements. The IC is an integrated circuit device and is vulnerable to external shocks. As illustrated in FIG. 10, a shield can 187 may further be provided to cover the drive chip 186.

For example, the camera 121, the interface unit 160 to be connected to an external device, the power connection port 193 for the input of a voltage, the sound output unit 152, and the ear jack plug 152' may be mounted on the main board 185, or may be connected thereto via a cable or a flexible board when they are separated, so as to be controlled by the main board 185.

The rear case 102, which covers the rear surface of the main board 185 and is coupled to the front case 101 or the middle frame 104, defines the rear-side appearance of the portable display device 100, and is generally formed of the same material as the front case 101. The rear case may be integrally formed so as not to be separated, or may be separably formed.

The portable display device 100 of the present invention may further include the stand 105 provided on the rear surface thereof to hold the portable display device 100.

Figure 5:
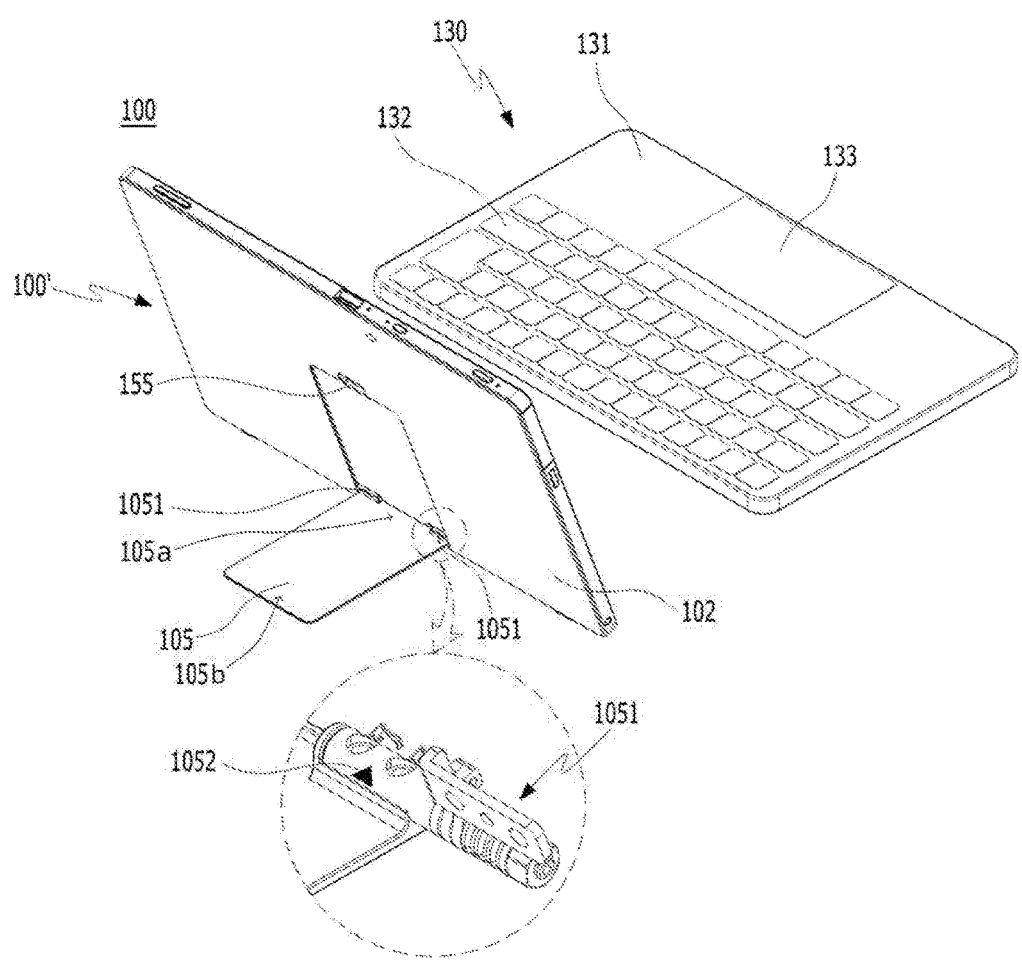
FIG. 5 is a side view illustrating the state in which the portable display device according to the present invention is held.

FIG. 5 is a view illustrating the state in which the portable display device 100 according to the present invention is held. The portable display device 100 includes the stand 105 configured to support a main body 100'. One end 105a (the lower end in the drawing) of the stand 105 may be coupled to one end of the rear surface of the portable display device 100 via a hinge. When carried, as illustrated in FIG. 3, the stand may be folded so as to be attached to the rear surface of the portable display device 100.

The stand 105 may be rotated and unloaded when it is held in use so that both the stand 105 and the main body 100' have an L-shaped form, as illustrated in FIG. 5.

The hinge 1051 may be rotated only when the user applies force having a predetermined magnitude, and may maintain a given angle, rather than being folded, even if the weight of the portable display device 100 is applied thereto.

Although FIG. 3 illustrates the form in which the stand 105 is hinge-coupled to the longer side of the portable display device 100 and extends in the direction parallel to the shorter side, the stand may be hinge-coupled to the shorter side and extend in the direction parallel to the longer side. Alternatively, multiple stands 105 may be provided and held in various directions.

When the length of the stand 105 is shorter than the height of the center of gravity, the stand 105 may not exert sufficient force for supporting the main body 100' when unfolded, and thus may fall backward when the user touches the upper end portion of the display unit 151. The other end of the stand 105 of the present invention is located above the center of gravity of the portable display device 100 to solve the problem described above. Assuming that the weight of the portable display device is not concentrated on a specific region, but is relatively uniform, the stand 105 is longer than half the length of the portable display device 100.

Although the stand 105 may be coupled to the rear surface of the rear case 102, the thickness of the portable display device 100 may be increased when the stand 105 and the rear case 102 overlap each other.

Therefore, in order to prevent an increase in the thickness of the region in which the stand 105 is present, as illustrated in FIG. 4, the stand 105 may be hinge-coupled to the middle frame 104 and the rear case 102 may be provided with an opening 102' corresponding to the shape of the stand 105 so that the stand 105 is exposed through the opening 102'.

When the rear case 102 and the stand 105 have the same thickness or when the thickness of the middle frame is reduced in the region in which the stand 105 is located, the stand 105 may not protrude from the rear surface of the portable display device 100, but may be in the same plane as the rear case 102.

The stand 105 may be unfolded when the user grips and pulls the other end 105b of the stand 105 toward the rear surface of the portable display device 100. At this time, since the user has difficulty in gripping the other end 105b of the stand 105 when the other end 105b of the stand 105 is located in the same plane as the rear case 102, the opening 102' in the rear case 102 may have an extended opening 102", which extends slightly from the other end 105b of the stand 105. The user may unfold the stand 105 by inserting a finger into the extended opening 102".

The stand may be no longer rotated and be fixed when it reaches a rotation limitation angle, and a mark 1052, which indicates that rotation is no longer possible, may be visible on the hinge 1051.

Figure 7:
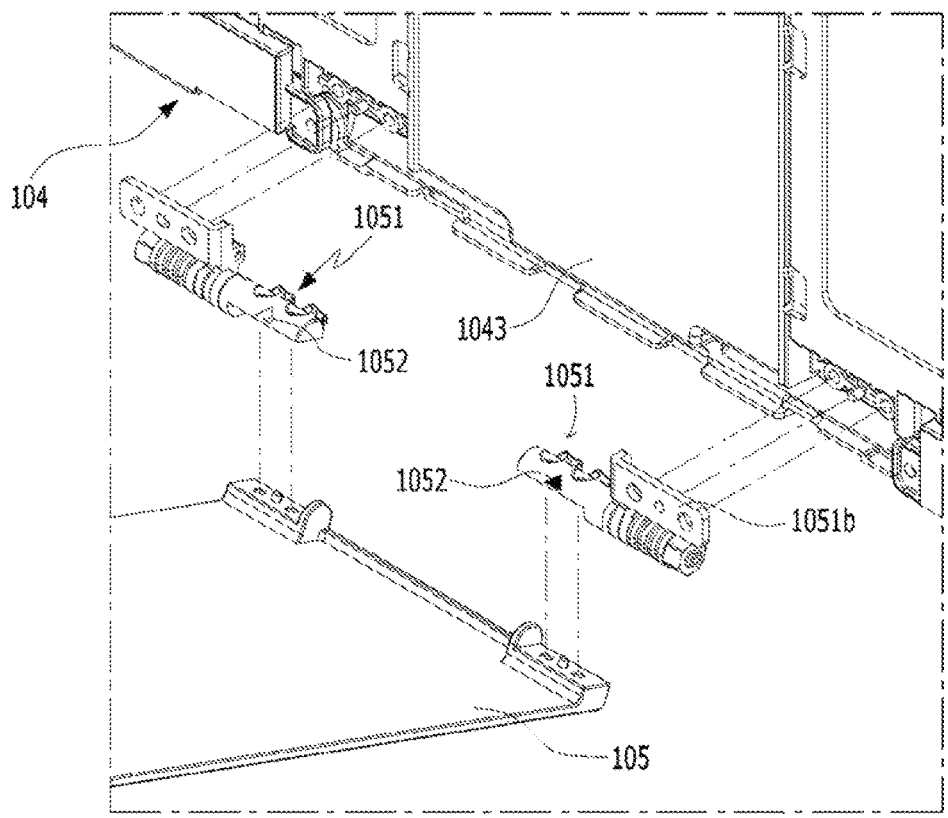
FIG. 7 is a perspective view illustrating various embodiments of a method of coupling the main body and the keyboard unit of the portable display device according to the present invention.

FIG. 7 is an exploded perspective view of a portion including the hinge 1051 of the portable display device 100 according to the present invention.

Two hinges 1051 are located respectively at both sides of one end of the stand and are fixed respectively to the middle frame 104 so that the end of the stand is rotatably inserted into shafts of the hinges 1051. Alternatively, the hinges 151 may be coupled to the stand and the middle frame 104 may be coupled to the shafts of the hinges 1051 so that the main body 100' is rotatable about the hinges 1051.

FIG. 7 illustrates the former case, and thus the following description is based on the embodiment of the former case. A portion 1043 of the middle frame 104 in which the hinges 1051 are located may be provided with an opening or may be recessed, which may prevent the thickness of the portable display device 100 from being increased due to the thickness of the hinges 1051.

The hinge 1051 may have a rotation tension set so as to be rotated only when force exceeding the weight of the main body 100' is applied thereto, in order to maintain a given angle between the main body 100' and the stand 105. The mark 1052, which indicates the rotation limitation angle, may be formed on the hinge 1051, and may be exposed when the stand 105 is unfolded, but hidden when the stand is folded.

When the portable display device 100 is obliquely held for use, as illustrated in FIG. 5, input using a touch keypad, which is displayed on the display unit 151, is inconvenient, and input using physical keys may reduce typing error compared to the touch input. However, when a keypad is added to a laptop computer, the keypad may cause inconvenience upon carrying. The keypad may also be inconvenient when input using keys is not frequent such as, for example, when viewing a movie or a document.

Accordingly, the portable display device 100 of the present invention may further include a keyboard unit 130, which is separable from the main body 100'.

The keyboard unit 130 includes a keyboard case 131 having a size corresponding to the size of the portable display device 100 and multiple keys 132 mounted on the front surface of the keyboard case 131. In addition to the keys 132, as illustrated in FIG. 5, the keyboard unit may include a touchpad 133 to add a mouse function.

The keyboard unit 130 may be connected to the main body 100' via a cable or by Bluetooth, so as to increase the functionality of the portable display device 100. At this time, the keyboard unit 130 may be integrally coupled to the main body 100' upon carrying since the separated keyboard unit 130 may cause inconvenience in carrying.

Figure 6:
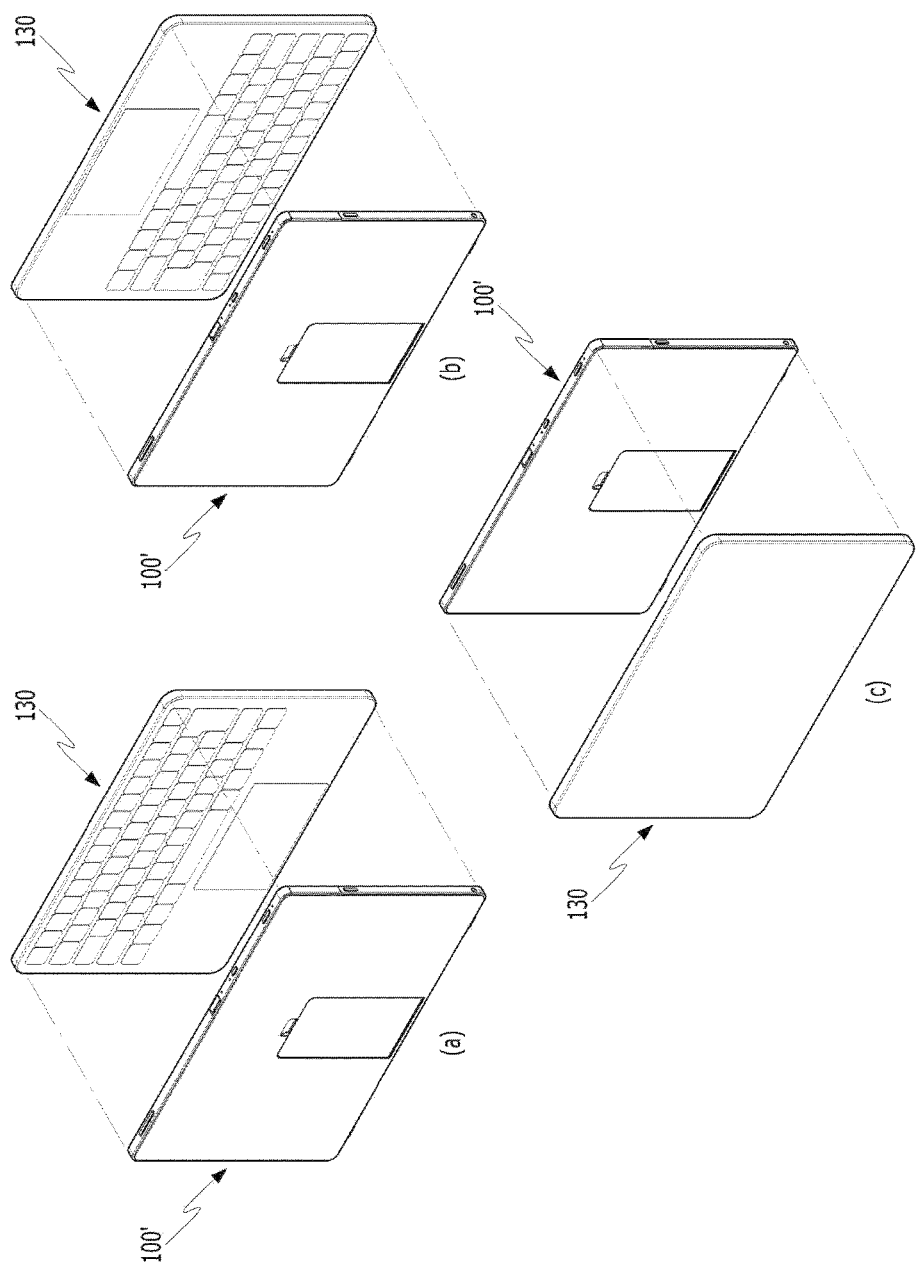
FIG. 6 is an exploded perspective view of a hinge portion of the portable display device according to the present invention.

FIG. 6 is a perspective view illustrating various embodiments of a method of coupling the main body 100' and the keyboard unit 130 of the portable display device 100 according to the present invention. As illustrated in FIG. 6(a), when the keyboard unit 130 and the main body 100' are coupled to each other such that the keys 132 on the front surface of the keyboard unit face the display unit 151 of the main body, the display unit 151 may be protected and the keyboard unit 130 may be easily carried along with the main body 100'.

As illustrated in FIG. 6(b), the keyboard unit 130 may be coupled to the portable display device 100 in the state in which it is rotated at 180 degrees. The keyboard unit 130 may be coupled to cover the rear surface of the main body 100' when the user views a movie, or travels on the subway.

The keyboard unit 130 and the main body 100' may be coupled to each other using magnets 139 and 109. Although one thereof may include a magnet and the other may include a metal material, this results in lower coupling force than the case where both include magnets. Accordingly, the main body 100' may include the main body magnet 109, and the keyboard unit 130 may include the keyboard magnet 139, which is provided at a position corresponding to the main body magnet 109 and has a polarity opposite that of the main body magnet 109.

Figure 8:
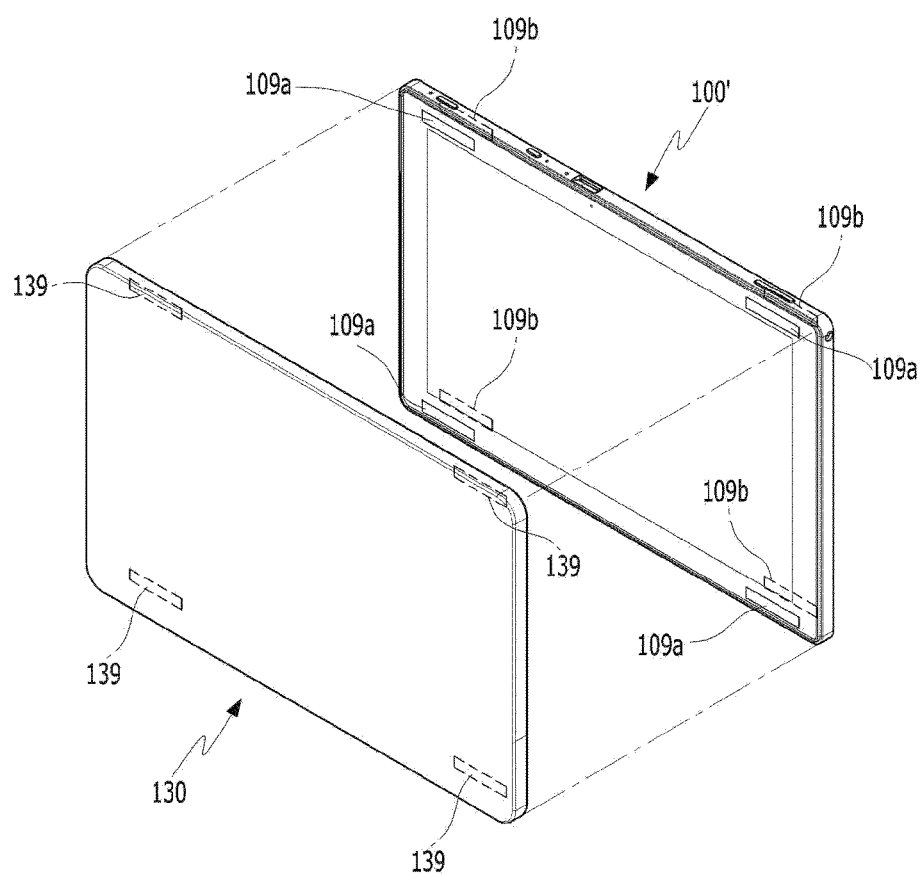
FIG. 8 is a perspective view illustrating various embodiments of a method of coupling a main body and a keyboard case of the portable display device according to the present invention.

For example, when the N-pole of the main body magnet 109 is disposed on the main body 100' so as to face the outside of the main body 100', the S-pole of the keyboard magnet 139 is disposed toward the front surface of the keyboard unit 130 having the keys 132. Referring to FIG. 8, in an embodiment in which four main body magnets 109 are provided near the respective corners of the main body 100', the main body magnets 109 may be disposed respectively in the front surface of the four corners of the main body 100' so that the N-pole (or the S-pole) thereof faces the front surface. The keyboard magnet 139 may be provided in the keyboard unit 130 at the position facing a corresponding one of the main body magnets so that the S-pole (or the N-pole), which has a polarity opposite that of the main body magnet 109, faces the front surface of the keyboard unit when the front surface of the keyboard unit 130 and the display unit 151 face each other.

The magnets disposed near the four corners are point-symmetrically arranged about the center of the main body 100'. As such, the keyboard unit 130 and the main body 100' may be coupled to each other even in the state in which one of them is rotated by 180 degrees, as illustrated in FIG. 6(b).

In order to couple the main body magnets 109 and the keyboard magnets 139 to each other in a point-symmetrical form, as illustrated in FIG. 6(c), the main body magnets 109 may be disposed in both the front surface and the rear surface of the main body 100' in the same manner.

At this time, since the S-pole (or the N-pole) of the magnet of the keyboard unit 130 faces the front surface of the keyboard unit, the main body magnet 109 in the rear surface of the main body needs to be disposed such that the N-pole (the S-pole) thereof faces the rear surface of the main body. At this time, since the main body magnet 109 disposed in the front surface and the main body magnet 109 disposed in the rear surface repel each other, these main body magnets are disposed close to the front surface and the rear surface respectively in order to minimize the effect on each other.

In addition, since the middle frame 104 formed of magnesium is located between the main body magnet 109 in the front surface and the main body magnet 109 in the rear surface, the magnetic forces of the magnets located in the front surface and the rear surface may be canceled out by the middle frame 104.

Figure 9:
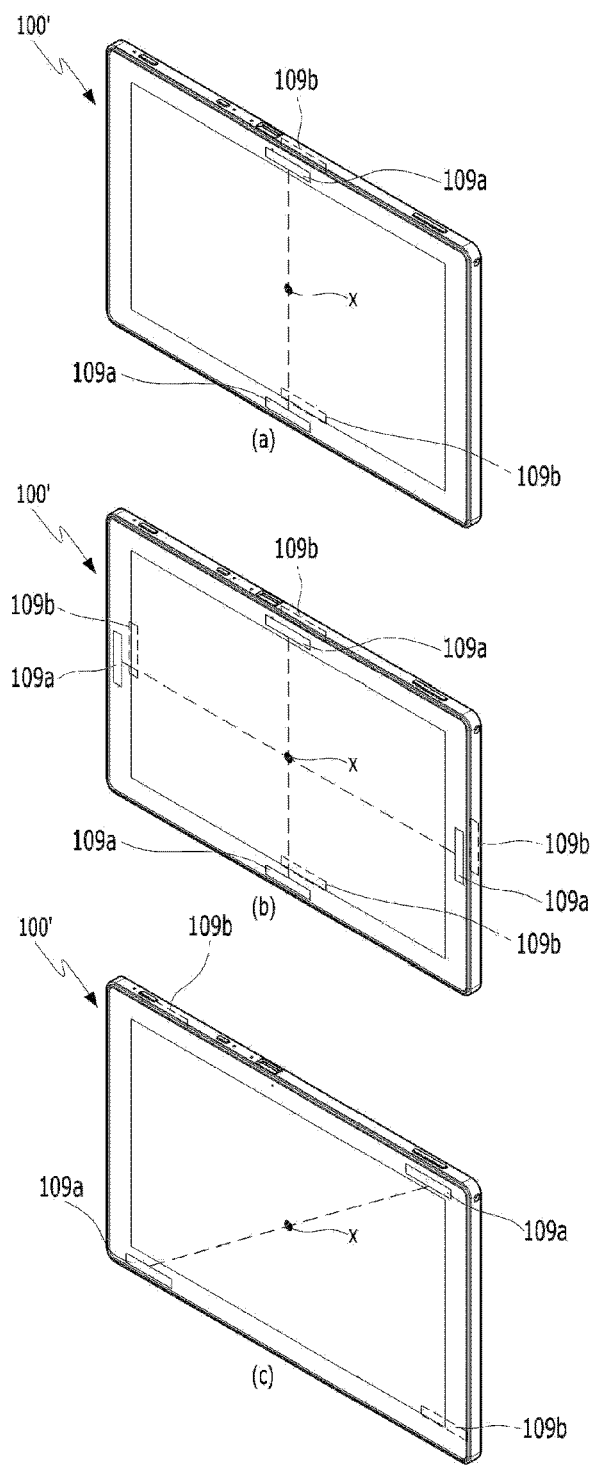
FIG. 9 is a perspective view illustrating various embodiments of magnets disposed in the main body of the portable display device according to the present invention.

In order to enable the coupling illustrated in FIG. 6 regardless of whether a direction is vertical and horizontal and whether a surface is the front or rear, the main body magnet 109 and the keyboard magnet 139 need to be point-symmetrical about the center of the main body 100' or the keyboard unit 130. FIG. 9 is a perspective view illustrating various embodiments of the magnets disposed in the main body 100' of the portable display device 100 according to the present invention.

The magnets may be located at the upper and lower center portions as illustrated in FIG. 9(a), and may further be located at the left and right center portions as illustrated in FIG. 9(b), in order to increase the coupling force. Alternatively, as illustrated in FIG. 9(c), an upper main body magnet may be located at the right end and a lower main body magnet may be located at the lower end so that the two main body magnets 109 are diagonally connected to each other. The left and right sides may be swapped.

In this case, when viewing the main body magnets 109 disposed in the rear surface from the rear surface, since the upper magnet is located at the right side and the lower magnet is located at the left side, the main body magnets 109 in the front surface and the main body magnets 109 in the rear surface may not overlap each other.

FIG. 10 is a view illustrating the arrangement of the battery 191 of the portable display device 100 according to the present invention. In order to describe the positional relationship between the battery 191 and the main board 185, the middle frame 104 is omitted. The battery 191 is disposed in a first area A having an L-shaped form, and the main board 185 is disposed in a second area A so as not to overlap the battery 191 in order to prevent an increase in thickness. Even if the size of the portable display device 100 increases, the sizes of other elements excluding the display unit 151 and the battery 191, i.e. the sizes of the main board 185 and the camera 121 do not change much.

Meanwhile, since power consumption increases when the size of the display unit 151 increases, the size of the battery 191 needs to further increase when the size of the display unit 151 increases. The battery 191 is generally manufactured to have a rectangular shape. However, when the shape of the battery is limited to a rectangular shape, the space utilization of the portable display device may be deteriorated.

In order to realize any desired shape of the battery 191 other than a rectangular shape, the structural change is required, which increases the cost. Thus, in order to solve this problem, multiple batteries 191 may be used to increase the space utilization. In the present invention, two batteries 191a and 191b may be used such that one battery 191a has a longer vertical side and the other battery 191b has a longer horizontal side. Thereby, the batteries 191a and 191b may be disposed such that the first area A occupied by both of the batteries has an L-shaped form.

When the two batteries 191a and 191b are arranged in an L-shaped form, the size of the space in which the main board 185 is located may be maximized within a limited space. FIG. 11 is a view for explaining a comparison between the present invention and the case where the two batteries 191a and 191b are disposed such that the longer sides thereof are disposed in the same direction.

As illustrated in FIG. 11(a), when the longer sides of the batteries 191a and 191b are disposed close to each other, the main board 185 needs to be disposed parallel to the battery 191, which causes a reduction in the space in which the main board 185 is disposed.

Alternatively, in order to provide the second area B, which is the space in which the main board 185 is mounted, as illustrated in FIG. 11(*b*), when the shorter sides of the batteries 191*a* and 191*b* are disposed close to each other, the horizontal length of the portable display device may be increased.

On the other hand, in the present invention, in order to maximize the spatial utilization of the electric unit without increasing the size of the portable display device 100, the battery 191 is disposed in an L-shaped form. A battery board 195, which is connected to a connection terminal 192 of the battery 191, may be connected to the main board 185 via a cable 196 so as to transmit the voltage of the battery 191 to the main board 185, and may store an external voltage applied from the power connection port 193 in the battery 191 via the main board 185.

The battery board 195, which connects the battery 191 to the main board 185, may be located between the two batteries 191*a* and 191*b*. However, since the connection terminal 192 is located at the shorter side of the battery 191 due to the internal structure of the battery 191, when the batteries are arranged in an L-shaped form, the connection terminal 192 of the battery 191*a* having a longer vertical side may be connected to the battery board 195 via a flexible board 194.

When the battery 191 has an L-shaped form, the main board 185 is located on one corner portion of the portable display device 100. Since a connector for connection with an external device such as the interface unit 160 or the power connection port 193 is located close to the side surface of the portable display device 100, the main board is located close to the side surface of the case 101 or 102.

Meanwhile, the display board 1515, which controls the display unit 151, is connected to one side of the display unit 151 via a flexible board 188 so as to be folded to the rear surface of the display unit 151. That is, the display board 1515 needs to be located close to one side of the electric unit, and therefore is located far from the other side of the electric unit so as to be spaced apart from the main board 185.

The main board 185 and the display board 1515, which are spaced apart from each other, may be connected to each other via the flexible board 188, which extends across the battery 191, as illustrated in FIG. 10.

Figure 12:
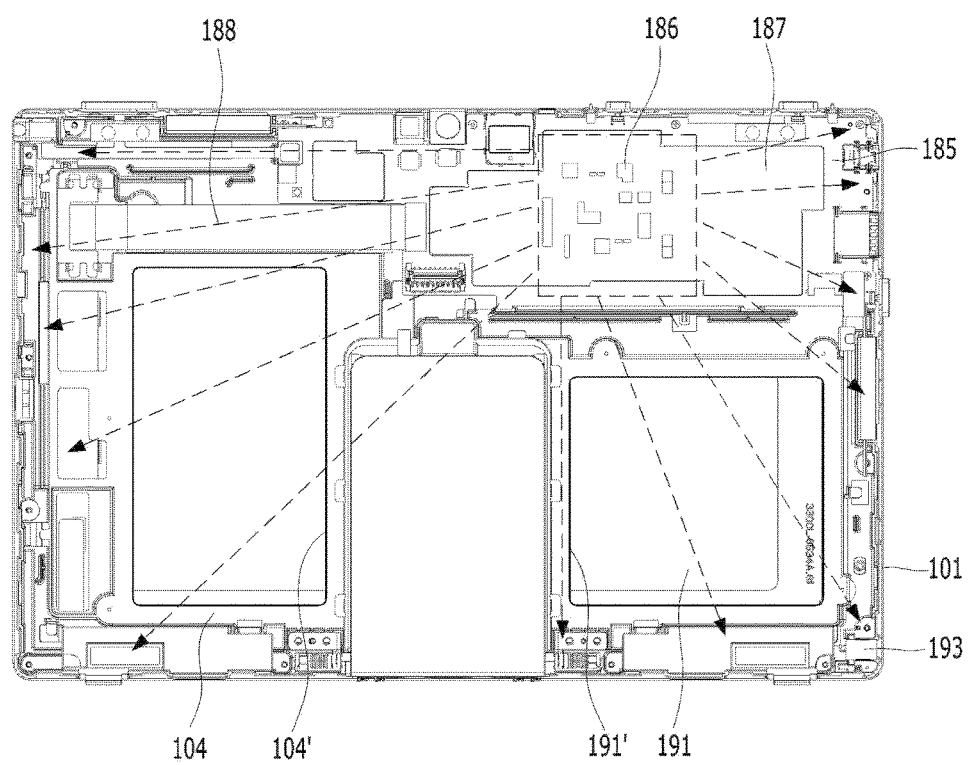
FIG. 12 is a view illustrating the flow of heat from the main board of the portable display device according to the present invention.

FIG. 12 is a view illustrating the flow of heat generated in the main board 185 of the portable display device 100 according to the present invention. The drive chip 186 mounted on the main board 185 generates heat when the display device 100 is driven. When the portable display device 100 is continuously used or when a large-capacity application is driven, the temperature in the drive chip 186 may rise to 40° C. or more owing to heat generation. At this time, the user may have difficulty in gripping and using the portable display device 100 and the drive chip 186 and the elements may be damaged by heat.

Therefore, it is necessary to distribute the heat generated from the drive chip 186 mounted on the main board 185, and the present invention has a feature in that the front and rear surfaces of the main board 185 diffuse heat simultaneously. First, the main board 185 is coupled so as to come into contact with the middle frame 104, which is formed of a metal material, and, as illustrated in FIG. 12, heat generated in the drive chip 186 of the main board 185 is diffused along the middle frame 104.

Figure 13:
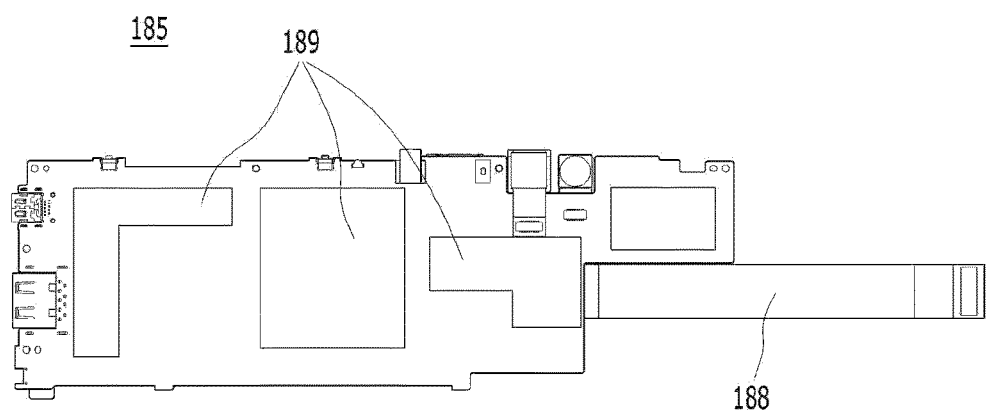
FIG. 13 is a view illustrating one surface of the main board of the portable display device according to the present invention.

FIG. 13 is a view illustrating one surface of the main board 185 of the portable display device 100 according to the present invention. As illustrated in FIG. 13, a heat transfer sheet 189 may be interposed between the middle frame 104 and the main board 185 in order to allow heat to be smoothly transferred from the main board 185 to the middle frame 104, as illustrated in FIG. 13.

The heat transfer sheet 189 may include, for example, ferrite or copper having high thermal conductivity, and may have adhesive strength to maintain the middle frame 104 and the main board 185 in close contact with each other. In particular, the heat transfer sheet 189 is located at the position of the main board 185 at which the drive chip 186, which generates a great amount of heat, is mounted.

In the middle frame 104, the second area B in which the main board 185 is located may have a minimum opening area and the first area A in which the battery 191 is located may have an opening therein. Even if a portion of the middle frame 104 is removed, the battery 191 may support the display unit 151 and the portable display device 100 may achieve sufficient rigidity. When the middle frame 104 has the opening 104' formed therein, material costs may be reduced and the weight of the portable display device 100 may be reduced.

Figure 14:
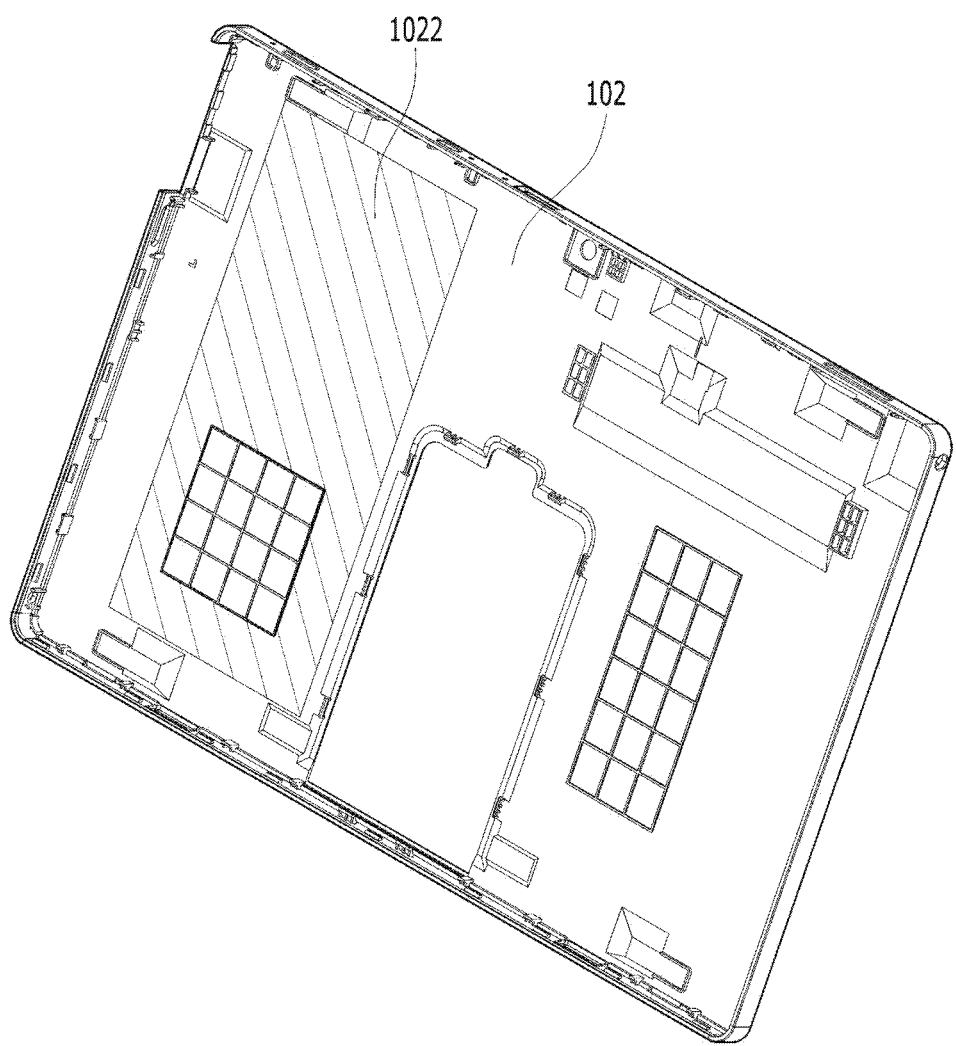
FIG. 14 is a view illustrating the inner surface of a rear case of the portable display device according to the present invention.

FIG. 14 is a view illustrating the inner surface of the rear case 102 of the portable display device 100 according to the present invention. In the rear surface of the main board 185, heat may be diffused using a radiation sheet 1022, which is located inside the rear case 102.

Since there is the least amount of heat in the battery portion of the portable display device 100, in order to transfer heat to the battery portion, as illustrated in FIG. 14, the radiation sheet 1022 may extend to the portion in which the battery is located.

The drive chip 186 of the main board 185, as described above, is protected by the shield can 187, and the shield can 187 includes a metal material. Heat absorbed by the shield can 187 is transferred to the radiation sheet 1022 and is diffused and radiated along the radiation sheet 1022. The rear case 102 is an outermost structure and the radiation performance of the rear case 102 is excellent.

The main board 185 of the present invention has excellent radiation performance because it may diffuse heat via the middle frame 104 and may radiate heat via the radiation sheet 1022 of the rear case 102.

Since the user typically grips the lower portion when using the portable display device 100, the main board 185 may be located in the upper portion.

According to at least one embodiment of the present invention, the portable display device 100 may be easily held and used anywhere without requiring that a separate holding device be additionally carried.

In addition, the keyboard unit 130 may be selectively carried. When carried, the keyboard unit 130 may be coupled to the main body 100' in order to increase convenience in carrying, and the display unit 151 may be protected using the keyboard unit 130. When the portable display device 100 is used without using the keyboard unit 130, the keyboard unit 130 may be coupled to the rear surface of the main body 100' so as to increase convenience in use.

In addition, the display device 100 may use the common battery 191, which may reduce manufacturing costs, and the capacity of the battery 191 may be increased without increasing the size of the display device 100.

In addition, heat generated in the drive chip 186 of the main board 185 may be easily radiated, which may prevent damage due to heat and may increase usability.

The above detailed description should not be construed to be limitative in any aspect, but is to be considered exemplary. The scope of the present invention should be determined by the reasonable interpretation of the accompanying claims, and all changes within the equivalent range of the present invention are included in the scope of the present invention.

The invention claimed is:

1. A portable display device comprising: a front case having a front surface on which a display unit is located; a battery disposed on a rear surface of the display unit; a rear case coupled to a rear surface of the front case so as to form an electric unit; a middle frame disposed on a rear surface of the battery and including a metal material; a main board disposed on a rear surface of the middle frame to allow heat to be transferred to the middle frame; a stand configured to rotate so as to be brought into contact with a rear surface of the middle frame or to be spaced apart from the rear surface of the middle frame; a hinge provided at one end of the stand and coupled to a lower end of the middle frame so as to provide the rotation of the stand; an opening formed in the rear case at a position corresponding to the stand, the opening corresponding to a shape of the stand; and an extended opening extending from one side of the opening, at which another end of the stand is located, so as to expose the middle frame, wherein the opening and the extended opening are continuously provided to form one hole.

2. The portable display device according to claim 1, wherein the stand has another end configured to be located above a center of gravity of the portable display device when the stand is folded so as to come into contact with the middle frame.

3. The portable display device according to claim 1, wherein the rear surface of the middle frame exposed by the extended opening includes an inclined surface, which is lowered with decreasing distance to the another end of the stand.

4. The portable display device according to claim 1, wherein the hinge is limited in rotation when it reaches a rotation limitation angle or more, and wherein the hinge displays a mark when reaching the rotation limitation angle.

* * * * *